United States Patent [19]

Van Leeuwen

[11] 4,265,422
[45] May 5, 1981

[54] POLE MOUNTING SOLAR PANEL ASSEMBLY

[75] Inventor: Matthew J. Van Leeuwen, Beverly Hills, Calif.

[73] Assignee: Atlantic Richfield Company, Los Angeles, Calif.

[21] Appl. No.: 74,173

[22] Filed: Sep. 10, 1979

[51] Int. Cl.³ .................................................. E04G 3/00
[52] U.S. Cl. ..................................... 248/219.1; 52/40; 248/231
[58] Field of Search .............. 248/219.2, 219.4, 219.1, 248/218.4, 219.3, 230, 231, 121, 122, 201; 126/417; 52/40, 697, 721; 211/107; 40/607

[56] References Cited

U.S. PATENT DOCUMENTS

| 102,633 | 5/1870 | Wheeler | 126/417 |
|---|---|---|---|
| 2,706,023 | 4/1955 | Merritt | 248/231 X |
| 3,320,681 | 5/1967 | Watlington | 248/218.4 X |
| 3,477,669 | 11/1969 | Thompson et al. | 248/230 X |
| 3,522,960 | 8/1970 | Moore | 248/231 X |

FOREIGN PATENT DOCUMENTS

| 2345651 | 10/1977 | France | 248/219.4 |
|---|---|---|---|
| 804073 | 11/1958 | United Kingdom | 211/107 |

*Primary Examiner*—J. Franklin Foss
*Attorney, Agent, or Firm*—Roderick W. MacDonald

[57] ABSTRACT

A single pole mounting solar panel assembly comprising at least one solar panel and upper and lower brackets fixed to the panel and to the pole, the upper bracket having a first flange means for mating with the pole and a first base plate fixed to the panel, the lower bracket means having a second flange means fixed to and encompassing a substantial portion of the circumference of the pole and a plane surface which extends out to the panel, the width of the plane surface varying from about the width of the pole to the width of the panel, the flange means for the lower bracket having upstanding side means extending longitudinally of the plane surface for about the full length of the plane surface, the side means and plane surface terminating at a second base plate fixed to the panel.

4 Claims, 5 Drawing Figures

POLE MOUNTING SOLAR PANEL ASSEMBLY

BACKGROUND OF THE INVENTION

Heretofore in some situations it has been desirable to mount solar panels, such as photovoltaic panels for the generation of electricity from sunlight, on poles which are resting on the earth or rooftops or the like, so as to fix the panels in an angular orientation relative to the pole which orientation generally points the operating surface of the panel in the direction of the sun.

Numerous support and bracket means have been employed for fixing the angularly oriented panel to the pole, but have suffered from a lack of lateral and angular stability so that over time and with exposure to the elements, the panel did not stay in its original position.

SUMMARY OF THE INVENTION

According to this invention there is provided a pole mounting solar panel assembly, and bracket means for such an assembly, which overcomes the prior art lateral and angular instability problems.

More specifically, the assembly of this invention employs one or more solar panels physically attached to upper and lower brackets. The upper bracket has a flange means which encompasses a portion of the circumference of the pole and has a base plate for attachment to the panel. The lower bracket means has a flange means which encompasses a substantial portion of the circumference of the pole, and is fixed to a plane surface which extends out to a base plate that in turn is fixed to the panel. The plane surface of the lower bracket is fixed to longitudinally extending side means which give the entire assembly substantial lateral and angular stability.

Accordingly, it is an object of this invention to provide a new and improved single pole mounting solar panel assembly. It is another object to provide new and improved bracket means for a single pole mounting solar panel assemblies.

Other aspects, objects and advantages of this invention will be apparent to those skilled in the art from this disclosure and the appended claims.

DETAILED DESCRIPTION OF THE INVENTION

Figure 1:
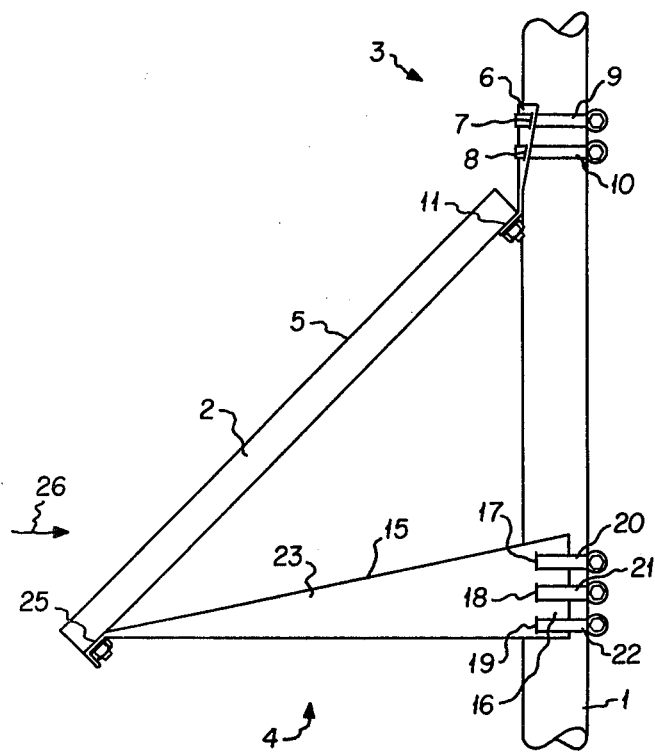
FIG. 1 shows a side view of the assembly of this invention mounted to a pole.

More specifically, FIG. 1 shows a pole 1 of any desired configuration (round, square, rectangular, etc.) and fixed to any support (not shown). Pole 1 is shown for sake of convenience in FIG. 1 as being round in cross-section and therefore having a circular external circumference. The assembly of this invention is shown in FIG. 1 to comprise a solar panel 2 fixed to upper bracket means 3 and lower bracket means 4 so that panel 2 is angled away from pole 1 thereby orienting operating surface 5 of panel 2 generally upwardly towards the sun.

It can be seen from FIG. 1 that upper bracket 3 has an upstanding flange means 6 which encompasses a portion of the circumference of pipe 1 and which has two sets of apertures 7 and 8 therein to accommodate pipe straps 9 and 10 which are employed to fix bracket 6 to pipe 1. It can also be seen that the lower edge of bracket 6 terminates in a first base plate 11 which angles away from pole 1 and is fixed to panel 2 by conventional means such as a plurality of bolts and nuts.

Lower bracket means 4 has an upper plane surface 15 which extends from pole 1 out to panel 2. Plane surface 15 carries a second flange means 16 which extends downwardly from surface 15 and which has a plurality of sets of apertures 17, 18 and 19 for receiving pipe straps 20, 21 and 22 for fixing flange 16 to pole 1. Also extending downwardly from plane surface 15 is a pair of upstanding sides, one of which is shown at 23, which extend along the length of plane surface 15 between pole 1 and panel 2 and from flange 16 to the point near panel 2 where surface 15 and, for example, side 23 meet at a second base plate 25. Plate 25 is also fixed to panel 2 by way of conventional means such as a plurality of nuts and bolts.

Figure 2:
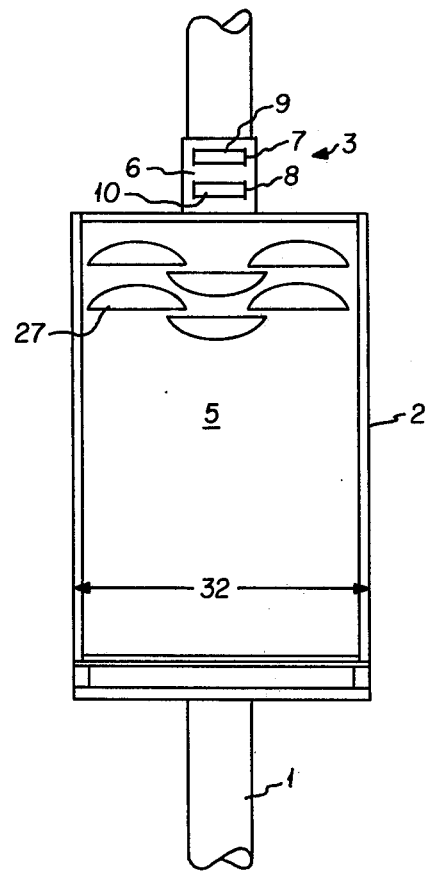
FIG. 2 shows a front view of the apparatus of FIG. 1.

FIG. 2 shows a front view of the apparatus of FIG. 1, i.e., looking at the apparatus of FIG. 1 from the direction of arrow 26 of FIG. 1. FIG. 2 shows panel 2 in this case, for sake of example, to be a photovoltaic panel which carries a plurality of photovoltaic cells 27 on operating surface 5. Cells 27 are oriented by the upper and lower brackets of FIG. 1 to face generally towards the sun. It should be noted that although in FIGS. 1 and 2 flange 6 is shown to extend upwardly from base plate 11, this invention also is intended to cover the embodiments wherein flange 6 extends downwardly from base plate 11 or a combination of upwardly and downwardly, i.e., base plate 11 joining intermediate the top and bottom of flange 6.

Figure 3:
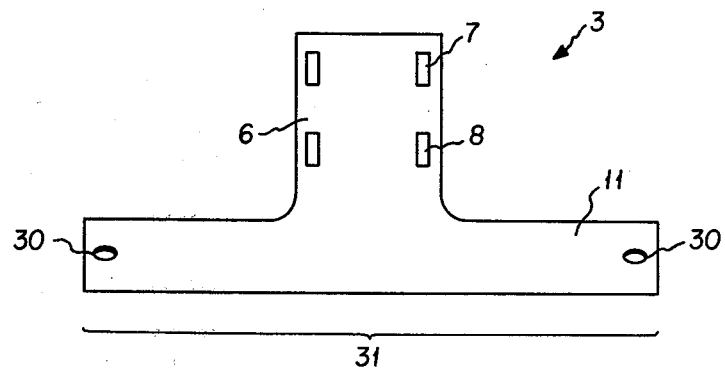
FIG. 3 shows a plan view of the upper bracket of the assembly of FIG. 1.

FIG. 3 shows upper bracket 3 with its pairs of apertures 7 and 8 for receiving pipe clamps 9 and 10 of FIG. 1 together with flange 6 carrying at its lower end a laterally extending base plate 11 which has apertures 30 therein for fixing base plate 11 to panel 2. Base plate 11 has a preferred lateral width 31 approximately the same as lateral width 32 of panel 2 as shown in FIG. 2.

Figure 4:
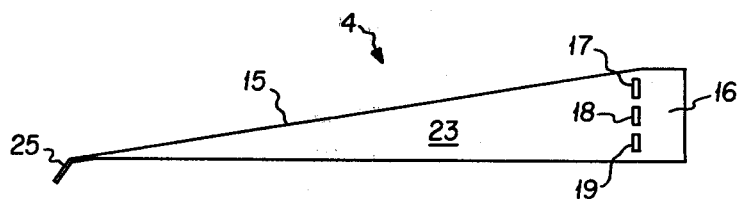
FIG. 4 shows a side view of the lower bracket of the assembly of FIG. 1.

FIG. 4 shows lower bracket 4 with its upper plane surface 15 and downwardly extending side 23 fixed to one another and to annular flange 16. FIG. 4 shows flange 16 to have pairs of apertures 17, 18 and 19 for receiving pipe straps 20, 21 and 22 of FIG. 1. Side 23 and plane surface 15 extend from flange 16 close to panel 2 and then merge into a second base plate 25 which is to be fixed to panel 2. Second base plate 25 and first base plate 11 should angle away from pole 1 to essentially the same degree, for example, 45° as shown in FIGS. 1 and 4. This way bracket 4 holds the lower end of panel 2 further away from pole 1 than upper bracket 3 thereby obtaining the desired orientation of operating surface 5 generally upwardly towards the sun.

Figure 5:
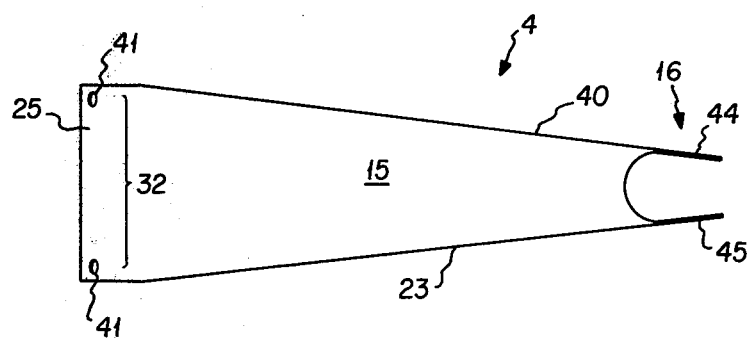
FIG. 5 shows a top view of the lower bracket of FIG. 4.

FIG. 5 shows a top view of bracket 4 and shows that flange 16 with its two sides 44 and 45 will extend around a substantial portion of the circumference of pole 1, e.g., at least one third of that circumference, so that bracket 16 wraps around pole 1 to a very substantial extent thereby providing stability to the assembly. Sides 23 and 40 which extend downwardly from plane surface 15 also provide a substantial stabilizing effect when combined with the wrap around feature of flange 16. The feature of plane surface 15 flaring out from about the width of pole 1 in the vicinity of flange 16 to approximately the width 32 of panel 2 in the vicinity of second base plate 25 also adds stability.

Second base plate 25 has a plurality of holes 41 therein for receiving bolts for fixing that base plate and bracket 4 to panel 2. Here also, although flange 16 and side walls 23 and 40 are shown extending downwardly from plane surface 15, it is to be understood that it is intended that this invention cover those embodiments wherein flange 16 and side walls 23 and 40 extend upwardly from plane surface 15 or combinations thereof, i.e., plane surface 15 being intermediate the top and bottom of flange 16 and sides 23 and 40.

Reasonable variations and modifications are possible within the scope of this disclosure without departing from the spirit and scope of this invention.

The embodiments of the invention in which an exclusive property or privilege is claimed are defined as follows:

1. A single pole mounting solar panel assembly comprising at least one solar panel and upper and lower brackets fixed to upper and lower, respectively, portions of said solar panel and being adapted to be fixed to said pole, said upper bracket having first flange means which encompasses a portion of the circumference of said pole and has means for fixing said flange means to said pole, said first flange means carrying a laterally extending first base plate which is fixed to said panel and angles away from said pole, said lower bracket having a plane surface which extends from said pole to said panel, said plane surface having a width adjacent said pole which is about the same as the width of said pole and which width flares out laterally as said plane surface approaches said panel until such width adjacent said panel approaches the width of said panel, second flange means carried by said plane surface adjacent said pole which flange means encompass a substantial portion of the circumference of said pole and has means for fixing said flange means to said pole, said second flange means having upstanding side means extending longitudinally of said plane surface for essentially the full length of said plane surface, said plane surface and side means terminating in a second laterally extending base plate which is fixed to said panel, said second base plate angles away from said pole to about the same degree as said first base plate, said plane surface being of such length as to hold the lower end of said panel further from said pole than the upper end of said panel.

2. Apparatus according to claim 1 wherein said second flange means and said side means all extend downwardly from said plane surface.

3. Apparatus according to claim 2 wherein said first flange means extends upwardly from said first base plate.

4. Apparatus according to claim 2 wherein said second flange means encompasses more than half of the circumference of said pole.

* * * * *